G. S. JONES.
COMBINATION BEE ESCAPE AND FEEDER CAP.
APPLICATION FILED MAR. 12, 1921.

1,414,284.

Patented Apr. 25, 1922.

INVENTOR
GRIFFITH S. JONES.
BY
*attys.*

UNITED STATES PATENT OFFICE.

GRIFFITH STANLEY JONES, OF KITCHENER, ONTARIO, CANADA.

COMBINATION BEE ESCAPE AND FEEDER CAP.

1,414,284.  Specification of Letters Patent.  Patented Apr. 25, 1922.

Application filed March 12, 1921. Serial No. 451,762.

*To all whom it may concern:*

Be it known that I, GRIFFITH STANLEY JONES, of the city of Kitchener, in the county of Waterloo, in the Province of Ontario, Canada, have invented certain new and useful Improvements in Combination Bee Escapes and Feeder Caps, of which the following is a specification.

My invention relates to improvements in combination bee escapes and feeder caps and the object of the invention is to devise means whereby at extracting time the operation of extracting may be rapidly done by providing a quick exit for the bees accommodating the rush of the bees so as to prevent their crowding and choking the exits and which will provide the bees with air to prevent the loss of bees by suffocation and will dispense with the necessity of smoking to drive the bees down into the brood chamber and at the same time to devise such a device which may be utilized for feeding the bees for the winter months so that the bees may be kept positively under control during the feeding and which eliminates the danger of the brood being chilled and it consists essentially of the following arrangement and construction of parts as hereinafter more particularly explained.

In the drawings like characters of reference indicate the corresponding parts in each figure.

Figure 1:
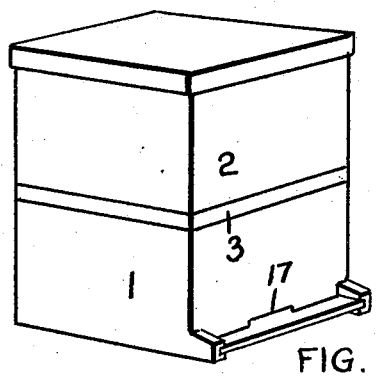
Fig. 1 is a perspective view of a hive showing the brood chamber and the honey chamber with a feeder board interposed therebetween.

1 indicates the brood chamber of a hive, 2 the honey chamber in which the combs are formed and 3 the feeder board which is inserted between the brood chamber and honey chamber. The feeder board 3 is provided with a surrounding ledge 4 and an opening 5.

6 is my bee escape the exterior walls of which are in the form of a cup 7 from the upper edge of which extends an annular horizontal flange 8. The cup 7 depends through the orifice 5, the flange 8 resting upon the upper face of the board being secured in position by the screws 9.

The side wall 10 of the cup 7 is provided with two series of orifices 11 and 12 arranged in staggered relation one to the other. Between the orifices 11 and 12 is located a perforated horizontal wall 13 having a central orifice 14. The bottom of the cup 7 and the annular wall 10 thereof are also perforated.

15 and 15× are arched bee ways extending radially inward from each of the orifices 11 and 12. Each bee way 15 and 15× is provided with outwardly extending and converging spring fingers 16 which have to be spread apart by the bee as it passes outwardly through the bee way.

Figure 2:
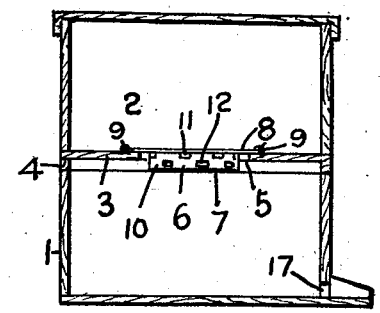
Fig. 2 is a sectional view through Fig. 1.
Figure 3:
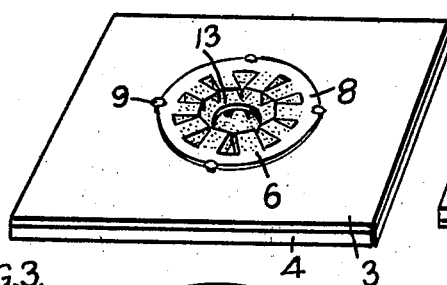
Fig. 3 is an enlarged perspective detail of the feeder board in the position when employed as a bee escape.
Figure 6:
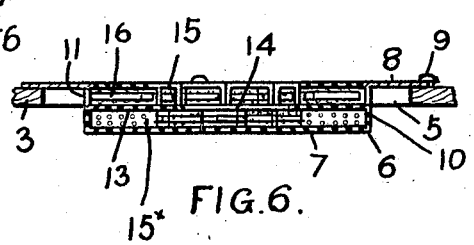
Fig. 6 is a sectional view through Fig. 5.

When it is desired to remove the combs from the hive chamber 2, the feeder board 3 is inserted between the chambers 1 and 2 in the positions shown in Figs. 1 and 2 and in the position shown in Figs. 3 and 6. When the bees take their daily fly they pass downward through the bee ways 15 and 15× into the brood chamber and out through the slot 17. As the bees pass through the bee ways 15 and 15× they spring the fingers apart.

It will thus be seen that when the bees return to the hive they will pass into the brood chamber through the slot 17 but cannot pass up into the hive chamber 2, being prevented by the spring fingers 15 which virtually form a closure for the slots 11 and 12.

Figure 4:
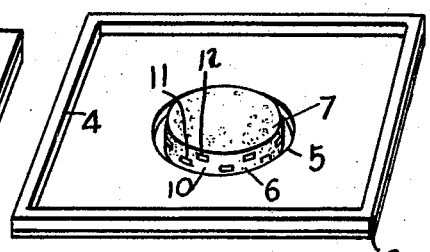
Fig. 4 is a similar view to Fig. 3 showing the feeder board inverted or in the position it assumes when feeding the bees.
Figure 5:
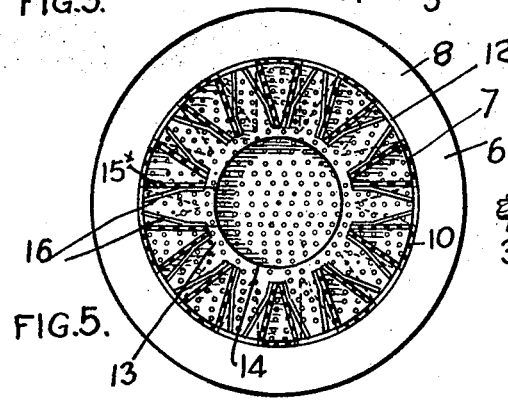
Fig. 5 is an enlarged sectional plan view of my bee escape.
Figure 7:
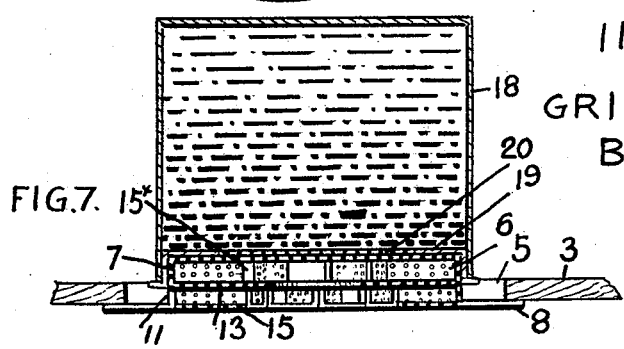
Fig. 7 is a similar view to Fig. 6 showing the bee escape in the position it assumes when feeding the bees and showing the syrup pail in position.

When it is desired to feed the bees for the winter months the feeder board is inverted into the positions shown in Figs. 4 and 7. A syrup pail 18 which is provided with a cap 19 having a perforated center portion 20 is inverted and placed over the perforated inverted cup 7 of the escape. The syrup in the pail slowly feeds down through these perforations and the bees within the brood chamber collect on the opposite side of the inverted cup bottom and feed upon the syrup and store it in the food chamber for the winter months.

The feeder board 3 may also be utilized as a ventilator which will prevent dampness detrimentally affecting the bees. When it is used in this way my bee escape is removed the feeder board being placed over the top of the brood chamber and the orifice 5 covered with a perforated disc. The top of the hive is then covered with leaves.

By this means it has been found that the bees may be successfully wintered without any loss whereas heretofore a large percentage of the bees have been lost through the bad effect of the weather upon them.

Although I have shown my feeder board with one central orifice it will of course be understood that it may be provided with a number of orifices each provided with a bee escape.

What I claim as my invention is:

1. In a bee escape, the combination with the feeder board having an orifice therein, of a cupped device secured around the orifice so as to depend therethrough and provided in its periphery with bee exit orifices, bee ways extending radially from such orifices and means permitting of the outward passage of the bee through the bee way and preventing the inward passage.

2. The combination with a feeder board having a central orifice, of a cupped device having perforated walls depending through the feeder board orifice and having bee exit orifices in its periphery, an annular flange extending outward from the cup and secured to the feeder board, bee ways extending radially inward from each of the bee exit orifices and means permitting of the outward passage of the bee through the exit orifices and preventing the inward passage.

3. The combination with a feeder board having a central orifice, of a perforated inverted cup member supported on the feeder board and extending through such orifice and adapted when inverted to enter and fit the perforated top cap of an inverted syrup pail.

GRIFFITH STANLEY JONES